Sept. 9, 1941.  W. E. HELMSTAEDTER  2,255,116
APPARATUS FOR MAKING BOXES
Filed Jan. 21, 1937
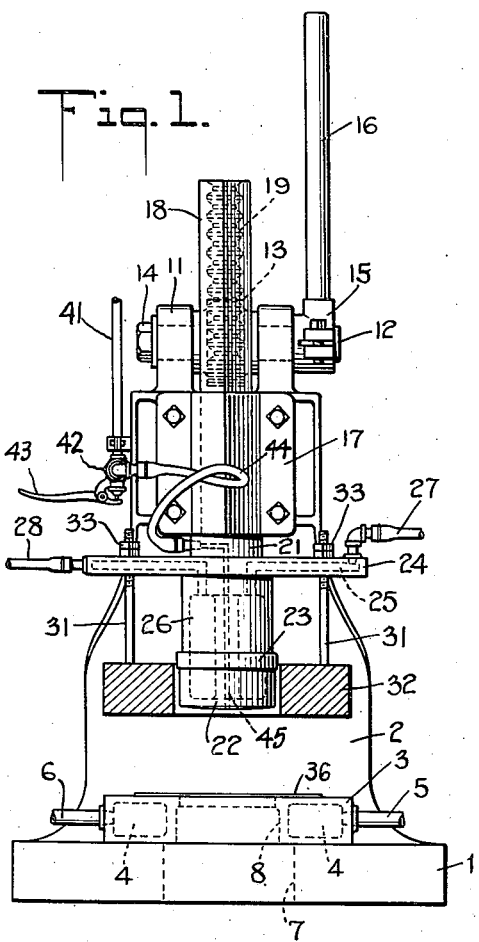
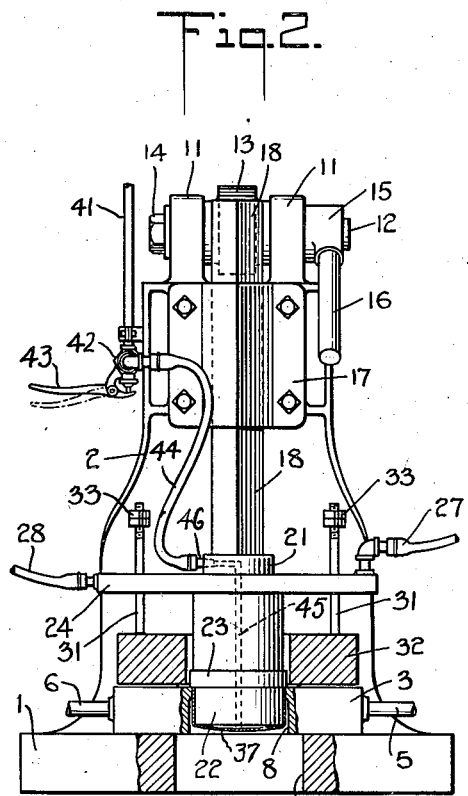
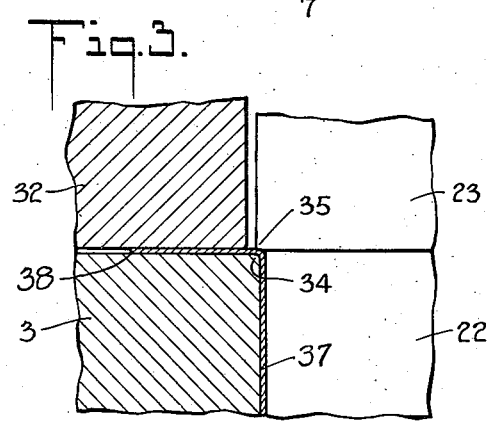
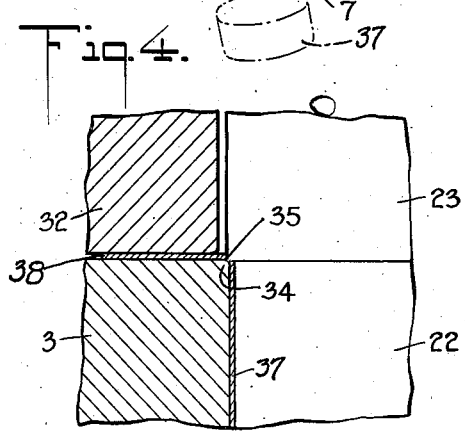
INVENTOR
William E. Helmstaedter
BY
ATTORNEYS Patented Sept. 9, 1941

2,255,116

UNITED STATES PATENT OFFICE 2,255,116

APPARATUS FOR MAKING BOXES

William E. Heimstaedter, Newark, N. J., assignor to Celluloid Corporation, a corporation of New Jersey Application January 21, 1937, Serial No. 121,615

1 Claim. (Cl. 18—19)

This invention relates to the molding of boxes from film, foil or sheet stock containing a thermoplastic base material such as nitrocellulose, an organic ester of cellulose, a cellulose ether, a mixed ether-ester of cellulose, a mixed ester of cellulose or a mixture of these, or thermoplastic synthetic resins or polymerization products.

An object of the invention is the economic and expeditious production of boxes or containers from film, foil or sheet stock containing a thermoplastic material. Another object of the invention is the production of boxes from film, foil or sheet stock, wherein the boxes are formed without a buckling or wrinkling of the side walls and with a smooth, clean edge at the open end. Another object of the invention is the production of boxes wherein the open end is smooth and free of reentrant angles or nicks which tend to reduce the tearing strength of the article. A still further object of the invention is the production of boxes formed from cardboard, paper, metal or other rigid or semi-rigid material and having a seamless covering thereover or therein in a snug relation thereto, which covering is made of a thin film, foil or sheet of the thermoplastic material.

Still another object of the invention is the construction of a device that molds blanks formed of films, foils and sheets of thermoplastic material into boxes having smooth edges and no wrinkles or buckled portions. Another object of the invention is the construction of a device that stamp-molds boxes from films, foils and sheet stock of thermoplastic material and that severs the box from the unused portion of the blank while simultaneously heat-sealing the severed edge. Other objects of the invention will appear from the following detailed description and drawing.

In the drawing, wherein like reference numerals refer to the same or similar elements in the several views, Fig. 1 is a front elevation, partly in section, of a device constructed in accordance with this invention showing the former in a raised position;

Fig. 2 is a front elevation, partly in cross-section, of the device shown in Fig. 1 with the former in a lowered position;

Fig. 3 is an enlarged view, partly in cross-section, of the former and die in a position just prior to the severing of the finished box from the remaining part of the blank, and Fig. 4 is an enlarged view, partly in cross-section, of the former and die in a position after severing and heat-sealing the open edge of the box.

The production of stamp-molded boxes from films, foils and sheets requires the use of a heated former and die. Along with the former and die there is necessarily means for severing the formed box from the unused part of the blank. The means for severing, or the cut-off as it is called by the trade, is a shoulder of steel on the former and its contour is identical with that of the die into which it must fit exactly, at the particular temperature at which the die is operating. Otherwise, should the temperature of the die be reduced slightly, as might be the case when it is desired to retain the polish on the blank, the die opening will contract and the cut-off will get stuck within it or might not pass through. Also, if it is desired to increase the temperature of the die, the die opening will expand, allowing the cut-off to pass through too freely, thereby not completely severing the material and producing a buckling thereof and/or a jagged edge.

With this type of device the temperature of the die and former must be maintained within close limits, say within 1° C. or 2° C. at the most of the temperature for which they were designed. As each type of film, foil or sheet of thermoplastic material requires different temperatures of molding depending upon the amount and kind of plasticizer they contain, the amount and kind of pigments they contain, the type of gloss or other finish desired and other circumstances, the employment of such devices are extremely limited. By employing the device in accordance with this invention, however, the same die and former may be employed successfully over a range of temperature changes that vary as much as 10° C. to 50° C. or more. This permits of the use of the same former and die to be employed with film, foil or sheet stock that differ widely in amount of plasticizer, pigments, dyes and other materials incorporated therein. This also permits the use of a heated die and a cooled former that is preferable in shaping very thin stock. The device even permits of a variance in the thickness of the film, foil or sheet employed on one set of die and former.

The use of the device of this invention results in boxes that are free from wrinkles and that have a clean, smooth and heat-sealed edge. By heat-sealed edge is meant an edge in which the thermoplastic material has been allowed, due to heat and pressure, to adjust itself to any internal stresses that may have been developed during the molding operation. In this respect it is similar to the heat treatment given glass tubing, etc. upon a freshly cut edge. The heat-sealing of the edge removes all small nicks, knife marks, etc. that form reentrant angles and it therefore reduces the possibility of the container tearing. This method of forming boxes produces boxes that are more tear resistant and of better appearance than those heretofore made.

A further advantage of this invention is that the device can be used longer without dismantling and/or changing dies and formers. As there is no sleeve action between the die and cut-off these parts may be made of glass hard steel which permits for unlimited use without the necessity of repair. In practice it is preferable to make the die of as hard a steel as possible and the cut-off slightly softer so that any wear will be on the cut-off which can be easily removed and trued up.

In accordance with my invention, I stamp-mold boxes from thermoplastic film, foil or sheet material and sever the boxes from the unused portion of the blank by means of heat and pressure, the pressure being exerted upon a line. Furthermore, in accordance with my invention, I construct a device for stamp-molding boxes from thermoplastic film, foil or sheet material wherein the cut-off member exerts no shearing action but severs the boxes from the unused parts of the blank by a molding action in such a manner that the edge of the box is completely severed from the remaining part of the blank and simultaneously heat-sealed to a smooth tear-resistant edge.

This invention is applicable to the formation of boxes from any suitable thermoplastic film, foil or sheet material. For instance, the blanks from which the boxes are to be formed may be made from thermoplastic materials containing nitrocellulose, of any suitable degree of nitration, or the organic derivatives of cellulose such as the organic esters of cellulose and cellulose ethers. Examples of organic esters of cellulose are cellulose acetate, cellulose formate, cellulose propionate and cellulose butyrate, while examples of the cellulose ethers are ethyl cellulose, methyl cellulose and benzyl cellulose. The blank material may also be made from the mixed ether esters of cellulose, such as ethyl cellulose acetate, or the mixed esters of cellulose, such as cellulose stearate-acetate. This invention is also applicable to the formation of boxes from blanks containing thermoplastic synthetic resins and polymerization or condensation products, such as urea formaldehyde resins, glycerol phthalicanhydride resins or any of the polyhydric alcohol-polybasic acid resins and the polymerization products of vinyl chloride, vinyl acetate, their derivatives and substitution products or mixtures of the same, also the polymerization products of acrylic acid esters such as methylmethacrylate. Synthetic rubbers known as Plioform, Duprene, Tornesite, etc., may be employed as the base material of the sheet stock.

The film, foil or sheet material may contain any suitable effect materials, such as plasticizers, dyes or lakes, pigments, filling materials, fire retardants, nacreous substances, etc. For instance, the film, foil or sheet material may be formed from cellulose acetate containing up to 20% of metallic oxide pigment, and from 15% to 150% of a suitable plasticizer such as dibutyl tartrate, dimethyl phthalate, triacetin, etc., based on the cellulose acetate content. Similarly other plasticizers and pigments may be used, depending upon the base material employed and the desired effect in the final product.

This invention is applicable to the formation of boxes from films, foils and sheet stock of any suitable thickness, for instance, from .001 to .05 or more inch in thickness. The invention is primarily of importance, however, in the forming of boxes from films and foils of very thin material, say from .001 to .01 inch in thickness. Prior attempts to stamp-mold boxes from such thin material has resulted in a great waste due to the buckling or wrinkling of the side walls or overheating due to the cut-off member on the forming device becoming lodged in the die. The present invention, however, successfully produces boxes of such thin material on a commercial basis.

The boxes formed of the thicker material may be used as a container. The thinner material made from the extremely thin foils, however, lacks sufficient rigidity for most purposes and collapses when filled. The thin boxes, however, have great utility either as a lining or as a covering for boxes made from cardboard, paper, combinations of paper and cardboard, metal, etc. For instance, the very thin foils may be formed into transparent boxes that are slipped over boxes made of cardboard covered with a printed and/or embossed paper such as those used for cosmetic containers. This gives to the box a highly glossy finish having a smooth surface which neither picks up powder nor other dust and which may be readily wiped clean. These very thin outer boxes or shells may be made to snugly fit the more rigid inner boxes and be placed thereon by slipping the thin container, the thin outer shell, over the more rigid container. An instrument similar to a shoe horn which is slipped between the rigid container and the shell has been found to be effective in placing the shell on the container. As the outer shell fits snugly on the more rigid container, air escapes only slowly from between the two and the pressure of the air in the thin shell makes it possible to exert a substantial force on the thin shell, without it collapsing, while pushing the same down over a more rigid box.

The thin boxes made of thermoplastic material may also be employed in a similar manner as the liner for more rigid boxes lending to the inside of the completed boxes a highly polished, smooth and glassy appearance under which may be printed, embossing or other marks which will be protected from and therefore unaffected by the material contained in the box due to the protection of the lining. Boxes having the appearance of metals may be formed by employing metallic pigmented thermoplastic material and using the boxes formed of the same as the outer and/or inner covering on more rigid boxes. It is also within the scope of this invention to use the boxes made of thermoplastic material alone, and to use two or more such boxes in conjunction with each other to build up a rigid container. It is also to be understood that by boxes is meant any suitable shaped container cylindrical or otherwise. The edge of the box may not necessarily be round, but may have an intricate shape depending upon the die and former. Thus besides cylindrical shape the boxes may be square, hexagonal, corrugated-cylindrical, etc.

By employing dyed, pigmented or filled thermoplastic materials such as those containing essence of pearl, Lahm, fibers, metallic flakes, etc., and using these over a printed or embossed paper box, many novel effects which were heretofore impossible may be obtained. The boxes made from thermoplastic material are seamless and there is, therefore, no doubling of the material to form a rigid or a deepening of the color which is normally produced in boxes formed with an overlapping seam.

The invention will be described in conjunction with the device shown in the drawing, which device is also a part of this invention. The device is carried on a suitable base 1 that is provided with an upright frame member 2 for supporting a former and other parts of the device. Mounted upon the base 1 is a die 3 provided with suitable cavities 4 in which there may be placed a heating element or through which may be circulated a heating fluid. The heating fluid is circulated through the cavities 4 by means of a pipe or hose connection 5 and is withdrawn after circulation, by a pipe or hose connection 6. The pipes or hose connections 5 and 6 may be connected with any suitable source of heating fluid which may be water, steam and the like. In place of a heating fluid, however, electric resistance coils, open flame or other suitable means may be placed in the cavities 4 for the purpose of heating the die 3. The base member 1 is provided with a cut-out portion 7 adapted to register with the cut-out portion 8 of the die to permit of the removal of the formed boxes therethrough.

Mounted upon the upright members 2 are a pair of journal boxes 11 adapted to contain bearings for the support of a shaft 12. Mounted on the shaft 12 is a gear 13. Also mounted on the shaft 12 are retaining means 14 and an operating lever 15, which operating lever is in the form of a collar positively fastened to the shaft 12 and having a handle 16 adapted for operating the shaft 12 by the rotation of the lever or handle 16. Also carried on the upright members 2 is a slideway 17 adapted to retain and guide a ratchet 18 provided with teeth 19 that register with the gear 13. Thus, by rotation of the handle 16 the ratchet 18 is raised and lowered.

One end of the ratchet 18 is fastened to a former head 21. The former head 21 carries a former 22 adapted to register with the die 8 in forming the boxes. Also carried by the former head 21 is an enlarged portion 23 that acts as the cut-off member. The former head 21 is provided with an extending plate 24 that contains a conduit 25 leading to the interior of the former head and former. By means of this conduit electric wires, combustible fuel pipes or other means for supplying heat to the former head may be led to the interior of the same, or, as is more preferable, the conduit 25 may be employed to carry heated fluid to chambers 26 in the interior of the former head, the former 22 and cut-off 23. The heating fluid may be introduced and withdrawn from the former by means of pipe or hose connections 27 and 28. On very thin material it may be preferable to cool instead of heat the former, in which case cooling fluid is circulated through the pipe or hose connections 27 and 28.

Plate 24 may be provided with holes through which pins 31 may pass freely. These pins are attached to a hold-down plate 32 and are equipped with adjustable locknuts or abutment members 33 at their opposite end. If desired, the hold-down plate 32 may be formed with means similar to the die for heating or cooling the same. Upon raising of the former head and plate 24 that is attached thereto, the hold-down plate is raised, while upon the lowering of the former head and plate 24, the hold-down plate goes to rest upon the die, or the blank of thermoplastic material which rests upon the die, prior to contact of the former with the thermoplastic blank. This hold-down plate rests freely and non-hampered on the die and the article being formed but is left free from the die before another blank is inserted. The pressure exerted by the hold-down plate is determined by its weight and may be varied according to the thickness or toughness of the material being formed into a box.

The upper edge 34 of the die 3 is slightly rounded while the lower corresponding edge 35 of the cut-off member 23 is preferably a sharp or right angle corner but it also may be slightly rounded. As the corner 34 is slightly rounded and the corner 35 is preferably a right angle corner they will always meet in a line contact irrespective of the amount of expansion and contraction of the parts 3, 22 and 23. It is preferable to maintain the corner 35 as sharp as possible and this may be accomplished by periodically trueing-up or squaring-up this edge with a stone. On the other hand, corner 34 is very slightly rounded. The edge 34 may be made sharp and square and then with an oil stone, or the like, may be rounded by taking off, say, about .01 inch of the metal. As either or both the cut-off member 23 and the die 3 are heated and in view of the pressure exerted between the cut-off 23 and the die 3, the thermoplastic material will be subjected to heat and pressure along a line contact, thereby severing the same by a molding operation along that line. Due to the heat and pressure the thermoplastic material is caused to flow slightly at that line to a degree sufficient to reduce any stress developed in the material at that point, thus producing a heat-sealed tear-resistant edge.

In operation of the device a blank 36 made of any suitable thermoplastic material is placed upon the heated die 3. The shaft 12 is then rotated by the handle 16 lowering the hold-down plate 32, the former 22 and the cut-off 23. The hold-down plate comes to rest on the blank 36 and acts to smooth out and/or hold the blank in place. The former 22 pushes the blank into the die 3 forming a box 37. The cut-off 23 then contacts the thermoplastic material of the box and with the cooperation of the corner 34 of the die pinches off waste portion 38 of the blank.

There is provided a source of compressed air which is connected to the device by the pipe 41. The pipe 41 is connected through a valve 42, having a trip handle 43, to a flexible conduit 44. One or a plurality of holes 45 are formed in the former, which holes enter at the working face of the former and end in a tap 46 connected to the flexible conduit 44.

After the box 37 has been severed from the unused portion 38 of the blank, the valve 42 is operated blowing the box off from the end of the former. If desired the former may be raised slightly or completely before the box is blown from the former.

If desired talc, aluminum hydroxide or other solid lubricating agent may be added between the die 3, the blank and the hold-down plate 32. This permits the blank to move into the die with greater ease.

It is to be understood that the foregoing detailed description is given merely by way of illustration and that many variations may be made therein without departing from the spirit of my invention.

Having described my invention, what I desire to secure by Letters Patent is:

Apparatus for stamp-molding boxes and like containers under heat and pressure from blanks of film, foil and sheet stock of thermoplastic material, comprising a die having an opening therein and a beveled edge at said opening, a former of smaller diameter than said opening adapted to cooperate with said die to shape the article, and an annular member of larger diameter than said opening in said die carried by said former, said member forming a right-angle with said former and having a right-angle edge thereon for registering with the bevelled edge of said die opening in a line contact so as to cause a nipping of the material along the line of severance to sever the molded article from the blank, whereby the severed edge of the molded article is smooth, heat-sealed and tear-resistant.

WILLIAM E. HELMSTAEDTER.